H. MOCK.
HEAT INSULATOR.
APPLICATION FILED MAY 23, 1921.

1,433,088.

Patented Oct. 24, 1922.

Hugo Mock INVENTOR

Patented Oct. 24, 1922.

1,433,088

UNITED STATES PATENT OFFICE.

HUGO MOCK, OF NEW YORK, N. Y.

HEAT INSULATOR.

Application filed May 23, 1921. Serial No. 471,863.

*To all whom it may concern:*

Be it known that I, HUGO MOCK, a citizen of the United States, residing at 930 St. Nicholas Avenue, in the city of New York, in the county of New York and State of New York, have invented certain new and useful Improvements in Heat Insulators, of which the following is a specification.

This invention relates to heat insulators and has for its object the provision of a heat insulator which will be economical and efficient.

The principal object of the invention is the employment of ordinary powdered sulphur as a heat insulator in a form in which it will be convenient to use and adaptable for various conditions.

It is well known that ordinary powdered sulphur is an excellent non-conductor of heat, but as a powder it is inconvenient to use on account of its tendency to pack or agglomerate and there are objections against the use of any heat insulator in powdered form. I obviate these defects by forming the sulphur by means of pressure or an adhesive into a brick and coating the outside of the brick with a plastic mass so that the brick will permanently retain its shape and can be used for lining walls, etc., as a heat insulator.

Figure 1:
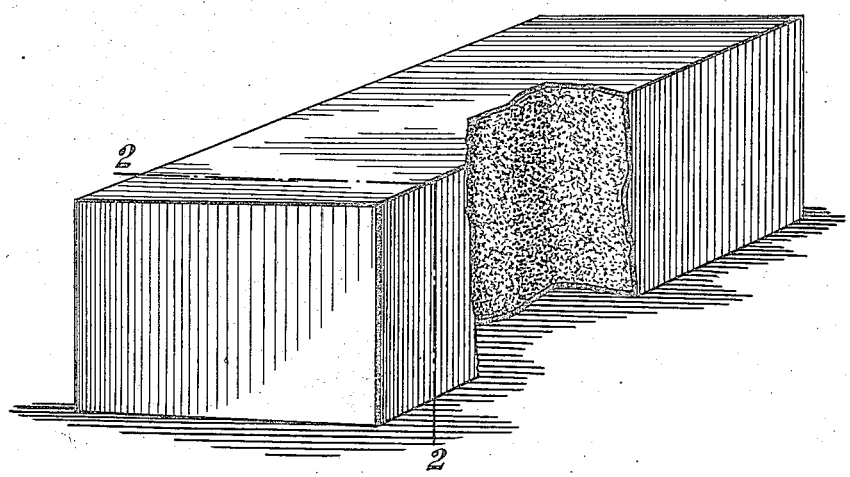
Figure 2:
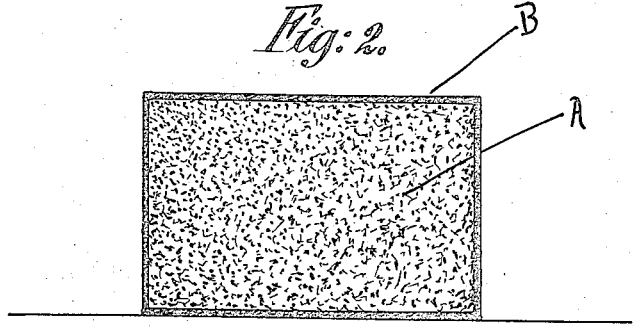

In the drawing, Figure 1 shows a perspective partly in section, of the improved heat non-conducting brick. Figure 2 shows a section of the brick along the lines 2—2 of Figure 1, A representing the sulphur interior of the brick and B the plastic lining.

The brick is made in the following manner:—

A quantity of powdered sulphur is taken and compressed with a small amount of pressure into the form of bricks shown as A in Figure 2. It is undesirable to use a great amount of pressure for the reason that it is not desired to agglomerate the sulphur as closely as possible, but in fact to retain a certain porosity in the sulphur brick itself. In order to facilitate the briquetting of the sulphur, a small amount of a binder may be added to the powdered sulphur such as paraffin wax, soft asphalt residues, or a similar substance, not over 5% of the binder being added to the sulphur. After the sulphur is properly briquetted, the bricks are coated on all sides thereof with asphaltum. This coating may be accomplished by rapidly dipping the bricks into the melted asphaltum and removing same immediately from said melted asphaltum so that only a thin layer of said asphaltum remains on the outside of the brick, care being taken that the sulphur brick is not exposed for a long time to the action of the heated asphaltum. Gilsonite or a similar product, of course, may be substituted for the asphaltum.

The bricks can also be painted with an asphaltum or rubber solution successively on the six sides thereof, and after the first coating is dry, a heavier coating may be applied by further painting or saturation in a solution of asphaltum or in melted asphaltum. If desired to increase the strength of the asphaltum coating, lampblack or a similar powder may be added to the asphaltum.

In this way a coated brick is obtained which is transportable and which may be easily joined to other bricks of a similar nature to form insulating walls.

I prefer asphaltum or rubber as the covering for this sulphur brick as there is a certain affinity between asphaltum or rubber and sulphur and it is possible by careful manipulation to partially vulcanize the layer of coating to the sulphur interior.

What I claim is:—

1. An insulating brick having a core of sulphur and an external layer of asphaltum.

2. An insulating brick having a core of powdered sulphur and an external layer of asphaltum.

3. An insulating brick having the interior thereof composed of powdered sulphur and a relatively thin outer covering of asphaltum.

4. An insulating brick having the interior thereof composed of powdered sulphur and a relatively thin covering of a flexible and adherent material.

5. An insulating brick having the interior thereof composed of sulphur with an outer coating of vulcanizable material.

In testimony whereof I hereunto affix my signature.

HUGO MOCK.